Feb. 28, 1961 J. S. EDGAR ET AL 2,973,047
ROCK DRILL BIT AND METHOD OF MANUFACTURE THEREOF
Filed Nov. 6, 1958
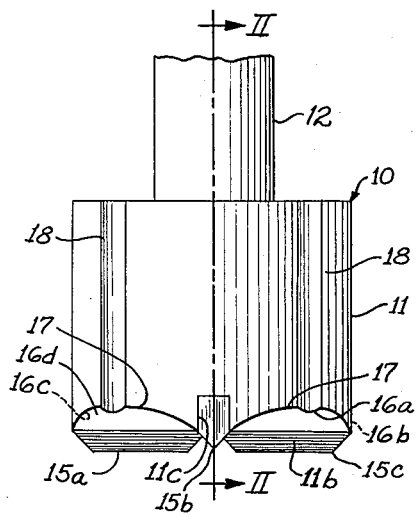
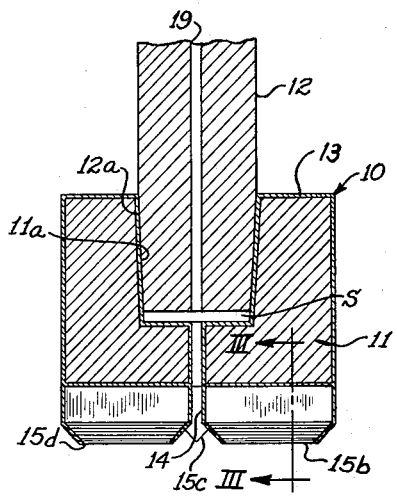
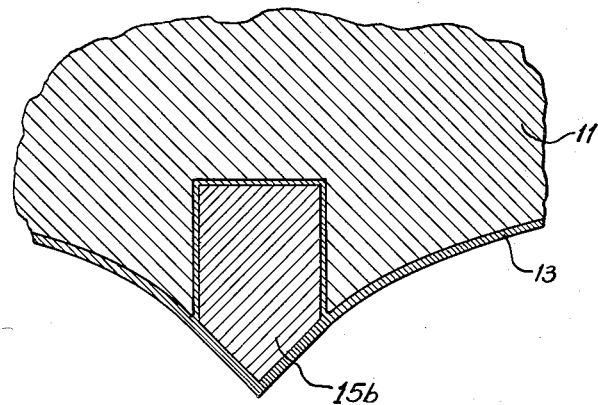
Inventors
John S. Edgar
John A. King
by Hill, Sherman, Meroni, Gross & Simpson Attys.

United States Patent Office 2,973,047
Patented Feb. 28, 1961

2,973,047
ROCK DRILL BIT AND METHOD OF MANUFACTURE THEREOF
John Stanley Edgar and John A. King, St. Catharines, Ontario, Canada, assignors to Thompson Products, Ltd., St. Catharines, Ontario, Canada, a corporation of Ontario Filed Nov. 6, 1958, Ser. No. 772,287

5 Claims. (Cl. 175—410)

The present invention relates broadly to rock drilling, and is more particularly concerned with a novel article and new and improved method of producing the same featuring an essentially continuous alloy coating covering the drill bit body, functioning to secure the inserts therein, reduce stress concentrations in notches in the body surfaces and to eliminate the need for shims between the body and drill rod.

Although the teachings of the present invention will be applicable to a number of phases in the drilling art, the particular invention will be described in detail in connection with rock drill bits. Such bits comprise a metal drill bit body, usually made of steel, having carbide inserts mounted on the drilling face thereof and having a socket on the back thereof for receiving the shank. It is conventional practice in the art to assemble the bit body and inserts by first heating the components to brazing temperature, and after applying a suitable flux, obtain securement between the components by use of brazing material in a preformed shape or by use of a brazing rod which is melted into the joint areas in sufficient quantity to fill the joint.

It has been found, however, that a common problem associated with carbide bit bodies is fatigue failure during use. While the causes of such fatigue may be many, generally, it is believed that the fatigue arises from machining, forging and like notches in the surface of the steel bit body which concentrate stresses and result in progressive cracking, eventually weakening the particular area until brittle fracture occurs.

In addition, one manner of effecting a friction fit between the drill bit and drill rod is to employ a shim of relatively softer material between the tapered end of the drill rod and the mating tapered socket in the drill bit. The shim material is generally copper, brass or bronze, and since it is softer than the mating parts, the shim swages in use and accommodates imperfection in fit between the tapered areas of the drill rod and drill bit socket, to provide a better connection. The shim, by keeping the two steel surfaces separated, reduces the tendency toward fretting corrosion and galling, which also cause fatigue failure. The shim is, however, not an integral part of either component of the connection, and as will be noted shortly hereinafter, the present invention obviates the need for this separate shim.

It is therefore an important aim of the present invention to provide a rock drill bit and method of producing the same which avoids each of the objects and disadvantages of the prior art structures and methods.

Another object of this invention lies in the provision of a method of manufacturing drill bits having carbide or similar inserts mounted on the drilling face thereof, said method providing a bit having surfaces essentially free of exposed machining and forging marks and thereby featuring a substantial reduction in the stress concentrations in said bit.

Still another object of the present invention is to provide a rock drill bit carrying upon the surfaces thereof a film or coating of alloy material effective to rigidly secure the carbide inserts to the drill bit body and additionally to achieve noticeable increases in the fatigue resistance properties of the bit body.

A further object of the invention lies in the provision of a method of producing insert mounting drill bit assemblies, featuring coating the exposed surfaces of the inserts and drill bit body with a continuous film of brazing material, the coating procedure functioning in addition to provide a heating cycle for hardening the steel components of the bit body.

An even further object of the invention is to provide a drill bit assembly wherein the rod socket walls are coated with an alloy film integral therewith, to thereby obviate the use of a separate shim between the rod and socket walls.

A still further object of this invention is to provide a method of fixedly securing carbide inserts within notches in a drill bit body which may be performed by a minimum number of personnel, results in substantial production economies, and provides a final article of substantially improved properties and characteristics.

Other objects and advantages will become more apparent during the course of the following description, particularly when taken in connection with the accompanying drawings.

In the drawings, wherein like numerals are employed to designate like parts throughout the same:

Figure 1 is a full view in elevation of a drill bit assembly embodying the principles of the present invention;

Figure 2 is an elevational sectional view taken substantially along the line II—II of Figure 1; and Figure 3 is a vertical sectional view taken substantially along the line III—III of Figure 2.

Referring now to the drawings, in Figures 1 and 2 there is shown a drill bit assembly indicated generally by the reference numeral 10, which comprises a metal drill bit body 11 having a wall portion 11a defining a generally cylindrical (but tapering slightly inwardly) shank-receiving socket therein, and a metal shank or rod 12 adapted to be press-fit into the socket defined by the walls 11a and having a corresponding wall portion 12a for engaging the socket wall portion 11a. In accordance with the principles of this invention, the metal drill bit body 11 is provided upon its exposed surfaces with a relatively thin metallic alloy coating or film 13 effectively improving the fatigue resistance of the bit body, and as will be described in detail later, rigidly securing the carbide inserts to the body, as well as obviating the need for separate shims between the shank and mating socket.

In the particular bit body 11 here shown, the drilling face 11b has four generally rectangular grooves 11c extending radially from a central aperture 14, and the grooves 11c seat suitable carbide inserts 15a, 15b, 15c and 15d therein. The inserts 15 provide the necessary cutting edges for effecting the drilling, and in order to provide a fluid outlet for drilling fluid, the bit body 11 is grooved at 16a, 16b, 16c and 16d on the drilling face 11b between the inserts 15a, 15b, 15c and 15d. Accordingly, the drilling fluid path is downwardly through the central aperture 4, then radially outwardly through channels at 17 on the drilling face 11b, and then longitudinally back or upwardly through channels designated as 18. An axially aligned channel 19 is provided in the shank or rod 12 for the flow of drilling fluid downwardly throughout the entire length of the shank 12 into the drill bit socket defined by the walls 11a and on downwardly through the axially aligned aperture 14 in the bit body 11. The shank 12 in many cases does not seat completely in the socket, and a space S if present therein also is filled with drilling fluid. The details of structure outlined in the present paragraph are merely exemplary of the type of drill bit assembly which may be used in the practice of the present invention; and it will be appreciated that various other drill bit body structures may also be used, the essence of the present invention residing in the coating 13 and its method of application to the drill bit body 11.

The coating or film 13 covering the entire surfaces of the drill bit body 11 is formed from a suitable molten brazing alloy, and is applied to said surfaces by dipping or immersing the body and inserts thereon in a molten bath of the alloy subsequent to preparatory steps of cleaning and fluxing the body and inserts. It is to be appreciated, however, that fluxing may not at all times be required. By practice of this procedure, an intimate brazed joint is effected between the bit body 11 and the inserts 15 positioned in the grooves 11c therein, as well as providing a brazed film upon the entire surfaces of the bit body 11 eliminating exposed machining and forging marks and thereby substantially improving the fatigue resistance of said drill bit body 11. Further, the molten brazing material provides the means of heating the steel body to the hardening temperature of the steel, and eliminates the prior art requirement of separate shims between the shank and socket.

The bit body 11 is formed of alloy steel and the inserts 15 preferably of straight tungsten carbide with a cobalt binder. Accordingly, the known silver brazing alloys or silver solders, being ternary alloys of silver, copper and zinc in varying proportions, provide a particularly satisfactory composition for the coating 13. Addition metals such as cadmium, tin, nickel, manganese and phosphorus may of course be used in the brazing composition. The silver brazing alloys perform particularly well in the present application by reason of their strength, low melting points, free flowing properties and resistance to corrosion; however, the brass and nickel silver brazing alloys or spelter solders have properties and characteristics which render them also suitable in the formation of the coating 13. Depending upon the particular percentages of silver, copper and zinc in the brazing alloy composition, the melting point generally varies from about 1165 degrees to 1450 degrees F. and the flow point between about 1200 degrees and 1565 degrees F.

Preparatory to application of the brazing alloy to the surfaces of the drill bit body 11 and inserts 15, the parts are cleaned to remove surface scale or oxides, as well as oil, grease and dirt. This may be accomplished in the manner customary in the art. The parts are then preferably fluxed, and the borax materials are suitable in dry, paste or saturated solution form. Certain of the special fluxes may also be employed, and dipping or brushing practices are satisfactory. Particular conditions may, however, render fluxing unnecessary, without sacrifice in braze strengths.

In order to effect a proper brazed joint between the inserts 15 and drill bit body 11, it is generally required that clearances exist therebetween. In other words, the generally rectangular grooves 11c should be of sufficient width to easily accommodate the inserts 15, with a small gap between the outer surfaces of the inserts and inner surfaces of the grooves. Accordingly, prior to dipping the bit body with the inserts thereon into the molten brazing alloy bath, relative movement between the body and inserts should be prevented. This may be accomplished in any desired manner, and a technique which has proven effective in practice is to swedge a plurality of lips from the steel body over the edges of the carbide inserts. In large scale production a fixture is used to produce a number of lips in a single operation, and for lesser quantities a hammer and punch is used. Other methods may of course be employed, and under particular conditions the use of swedging lips may not be required.

The brazing alloy is preferably melted in a refractory container and covered with flux to prevent oxidation. The bath may be heated by any of the methods used with pot furnaces, and if desired, the parts to be coated may be preheated to minor extent. The temperature of the alloy bath is maintained at about the flow point of the particular alloy being employed, and the length of dipping or immersion time will vary with the alloy, the size and composition of the parts being coated, and of course the particular thickness of coating desired. Normally, however, a relatively slow single dip stroke will be sufficient for most applications.

Upon removal from the bath the bit body 11 and the inserts 15 located in the grooves 11c therein are found to carry a coating 13 of essentially uniform thickness throughout. As is shown in Figure 3, the coating 13 effects a uniform thickness brazed joint between the inserts 15 and the walls of the grooves 11c in the bit body 11. A rigid joint or bond is obtained by surface alloying of the base metal and the brazing metal which is of sufficient strength to adequately maintain the inserts within the grooves 11c. Further, by the coating of this invention, the entire surface area of the bit body 11 is essentially free of exposed machining and forging marks. Therefore, when a force is applied to the drill bit, there is not the usual surface imperfections to cause stress concentrations. Brittle fracture is accordingly markedly reduced.

In addition, since the wall portion 11a defining the shank receiving socket carries an adherent film of brazing alloy which is an integral part of the body 11, the prior art requirement of separate shims between the shank or rod and body is eliminated. Thus, as earlier noted, it is no longer required that a relatively thin shim of copper, brass, bronze or like softer material be employed between the mating surfaces of the drill rod 12 and drill bit socket wall 11a, in order to effect the friction fit wedged attachment between the rod and drill bit.

The method of this invention employs commercially available materials, and is accordingly characterized by substantial economies in its practice. The process may be performed in a minimum length of time with only a limited number of personnel. The results to be obtained are readily predictable, and the product obtained is characterized by superior strength and the other advantages earlier noted.

It is to be understood that variations and modifications may be practiced in the methods and articles herein disclosed without departing from the novel concepts of the present invention.

We claim as our invention:

1. A drill bit for rock drilling and the like, comprising a shank, a bit body provided with a shank socket receiving said shank, insert receiving notches in said body and inserts in said notches, and an essentially continuous dip coating of brazing alloy material entirely covering said body and bonded to the body shank socket walls and to the notch surfaces and inserts therein to effectively reduce stress concentrations in said body, to bond said inserts to the body and to eliminate the need for separate shims within the shank socket to hold the shank therein.

2. A drill bit for rock drilling and the like, comprising a bit body and drilling inserts carried by said body and located in notches provided therein, and a layer of alloy material of substantially uniform thickness bonding the inserts to the bit body notch surfaces, the same alloy layer essentially completely covering the bit body and inserts to eliminate exposed surface imperfections in the body and reduce substantially stress concentrations therein.

3. A drill bit for rock drilling and the like, comprising a bit body and drilling inserts carried by said body and located in notches provided therein, and a dip coating of alloy brazing material of substantially uniform thickness bonding the inserts to the bit body notch surfaces, the same dip coating essentially completely covering the bit body and inserts to eliminate exposed surface imperfections in the body and thereby reduce substantially stress concentrations therein.

4. A method of producing drill bit assemblies for rock drilling and the like, comprising locating a drill bit body with a plurality of inserts in the notches thereof in submerged relation within a bath of alloy material, and coating the body and inserts with an essentially continuous film of alloy material of substantially uniform thickness throughout to bond the inserts to the body while eliminating exposed surface imperfections in the body and thereby reduce stress concentrations therein.

5. A method of producing drill bit assemblies for rock drilling and the like, comprising locating a plurality of inserts within notches in a drill bit body, restraining said inserts against movement relative to the body, and dipping the body and inserts thereon into a bath of brazing alloy material to bond the inserts to the body and coat said body and inserts with a coating of substantially uniform thickness essentially completely encasing the body and inserts to eliminate exposed surface imperfections and thereby reducing stress concentration therein.

References Cited in the file of this patent

UNITED STATES PATENTS

| | | |
|---|---|---|
| 1,697,086 | Pryce | Jan. 1, 1929 |
| 2,698,810 | Stauffer | Jan. 4, 1955 |
| 2,743,495 | Eklund | May 1, 1956 |
| 2,875,110 | Rossander | Feb. 24, 1959 |